(12) United States Patent
Soliman et al.

(10) Patent No.: US 8,144,682 B2
(45) Date of Patent: Mar. 27, 2012

(54) METHOD AND APPARATUS FOR ENHANCING SIGNAL-TO-NOISE RATIO OF POSITION LOCATION MEASUREMENTS

(75) Inventors: Samir S. Soliman, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/036,393

(22) Filed: Feb. 28, 2011

(65) Prior Publication Data
US 2011/0149922 A1 Jun. 23, 2011

Related U.S. Application Data

(62) Division of application No. 11/120,411, filed on May 2, 2005, now Pat. No. 7,920,544.

(60) Provisional application No. 60/666,138, filed on Mar. 28, 2005.

(51) Int. Cl.
*H04B 7/212* (2006.01)
*H04B 15/00* (2006.01)
*H04J 3/06* (2006.01)
*H04W 24/00* (2009.01)

(52) U.S. Cl. ............ 370/347; 370/350; 455/456.1; 455/502

(58) Field of Classification Search .......... 370/321, 370/337, 347, 350; 455/456.1, 456.2, 456.5, 455/456.6, 502
See application file for complete search history.

(56) References Cited

U.S. PATENT DOCUMENTS
6,169,903 B1 * 1/2001 Dorenbosch et al. ........ 455/458
6,950,663 B2 9/2005 Pihl et al.
7,164,925 B2 * 1/2007 Bar et al. .................. 455/456.5
2001/0014133 A1 8/2001 Taverdet
2005/0090268 A1 4/2005 Yamasaki et al.

FOREIGN PATENT DOCUMENTS
| EP | 1148752 | 10/2001 |
|---|---|---|
| JP | 2000224645 | 8/2000 |
| JP | 2002058058 | 2/2002 |
| JP | 2002191065 | 7/2002 |
| JP | 2003087849 | 3/2003 |
| JP | 2004320208 | 11/2004 |
| WO | WO9803881 | 1/1998 |

OTHER PUBLICATIONS
International Search Report and Written Opinion—PCT/US2006/011304, International Search Authority—European Patent Office—Oct. 25, 2006.

* cited by examiner

*Primary Examiner* — Un C Cho
(74) *Attorney, Agent, or Firm* — Liberty E. Mann

(57) ABSTRACT

A method and apparatus for generating and use of a position location reference signal that allows a receiver to receive position location signals from relatively weak signal generators when in the presence of a strong signal source. The position location reference signals from multiple sources can be synchronized to occur within a scheduled time slot of a time division multiplexed communication system. During the scheduled time slot, each signal source can configure a transmission that includes a media access control address that corresponds to a value reserved for position location signals. Each signal source also configures the transmission to include a position location reference signal that corresponds to the signal source. The position location signals from each of the signal sources is positioned to occur at a time within the data portion of the scheduled time slot that no neighboring signal source transmits its corresponding position location signal.

33 Claims, 6 Drawing Sheets ions.
METHOD AND APPARATUS FOR ENHANCING SIGNAL-TO-NOISE RATIO OF POSITION LOCATION MEASUREMENTS This application is a divisional of application Ser. No. 11/120,411, which was filed on May 2, 2005, is herein incorporated by reference, and claims priority from U.S. Provisional Application No. 60/666,138, which was filed on Mar. 28, 2005, and is also herein incorporated by reference.

This disclosure relates generally to electronic communications. More particularly, the disclosure relates to wireless position location, and signals in a wireless position location system.

BACKGROUND OF THE DISCLOSURE

In many applications it may be advantageous to have the ability to determine a position of a mobile device. Position location may be helpful for navigation, tracking, or orientation applications. The continual advancement of the performance of portable electronics, particularly the advancements in the performance of processors, allows position location capabilities to be added in a variety of devices.

For example, it may be desirable for an operator of a mobile telecommunications system such as a cellular telecommunications system to be able to determine the position of a mobile handset during communication with a base transceiver station (BTS) of the system. A system operator may desire position location capabilities, for example, to satisfy the U.S. Federal Communications Commission (FCC) E911 emergency position location mandate.

Mobile devices may implement one or more position location techniques depending on the position location signaling methods used in the position location system. For example, a mobile device may use time of arrival (TOA), time difference of arrival (TDOA), advanced forward link trilateration (AFLT) or some other position location technique. Examples of position location systems include those that are based on the Global Positioning System (GPS), those that augment (he GPS system with terrestrial based beacons such as hybrid position location systems, and terrestrial based beacon position location systems. In one example, the mobile device can determine its position by determining absolute delay measurements to two terrestrial beacons or relative delay measurements to at least three terrestrial beacons.

Most terrestrial ranging systems incorporate a pseudo noise (PN) code in a direct sequence spread spectrum configuration. Each position location beacon can transmit a PN code that identifies the beacon. In a time division multiplexed forward link communication system, the position location beacons can be synchronized to transmit a corresponding position location PN code at substantially the same time.

A mobile device can identify a particular source, in part, by correlating a received PN spread signal with an internally generated version. However,; a mobile position location device in a terrestrial based system can receive widely disparate signal powers. One problem that mobile devices encounter is associated with the receiving widely disparate signal powers.

In certain situations, the mobile device is only able to determine the position location signal from one beacon because the signal from the beacon is so strong that it interferes With signals from other beacons. The signal to noise ratio of the position location signals from the surrounding beacons is too low for the mobile device to extract useful ranging measurements. A mobile device may experience this effect when it is relatively near one beacon and relatively far from surrounding beacons. The effect is typically referred to as the near-far problem.

Therefore, it is desirable to have a position location signaling technique, system, and device that allow for high performance position location in a variety of conditions, including a near-far condition, and yet may be implemented in a practical manner.

BRIEF SUMMARY OF THE DISCLOSURE

A method is disclosed for determining a position of a mobile device in a time division multiplexed communication system, the method comprising: receiving a synchronized position location slot, wherein the synchronized position location slot includes a plurality of sub-slots assigned to a plurality of position location signal sources, and an identifier indicating the synchronized position location slot includes position location information; determining from a first sub-slot in the synchronized position location slot, a first position location signal corresponding to a first position location signal source; determining from a second sub-slot in the synchronized position location slot, a second position location signal corresponding to a second position location signal source; and determining a timing related to position based on the first and the second position location signals.

An apparatus is disclosed for determining a position of a mobile device in a time division multiplexed communication system, comprising: means for receiving a synchronized position location slot, wherein the synchronized position location slot includes a plurality of sub-slots assigned to a plurality of position location signal sources, and an identifier indicating the synchronized position location slot includes position location information; means for determining, from a first sub-slot in the synchronized position location slot, a first position location signal corresponding to, a first position location signal source; means for determining, from a second sub-slot in the synchronized position location slot, a second position location signal corresponding to a second position location signal source; and means for determining a timing related to position based on the first and the second position location signals.

A computer-readable medium including program code, stored thereon, is disclosed for determining a position of a mobile device in a time division multiplexed communication, system, comprising: program code to receive a synchronized position location slot, wherein the synchronized position location slot includes a plurality of sub-slots assigned to a plurality of position location signal sources, and an identifier indicating the synchronized position location slot includes position location information; program code to determine from a first sub-slot in the synchronized position location slot, a first position location signal corresponding to a first position location signal source; program code to determine from a second sub-slot in the synchronized position location slot, a second position location signal corresponding to a second position location signal source; and program code to determine a timing related to position based on the first and the second position location signals.

An apparatus is disclosed for determining a position of a mobile device in a time division multiplexed communication system, comprising: an RF frontend for receiving a synchronized position location slot, wherein the synchronized position location slot includes a plurality of sub-slots assigned to a plurality of position location signal sources, and an identifier indicating the synchronized position location slot includes position location information; and a baseband processor for: determining from a first sub-slot in the synchronized position location slot, a first position location signal corresponding to a first position location signal source; determining from a second sub-slot in the synchronized position location slot, a second position location signal corresponding to a second position location signal source; and determining a timing related to position based on the first and the second position location signals.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF THE DISCLOSURE

A position location system that includes terrestrial-based beacons can virtually eliminate the effects of the near-far problem by implementing a position location signaling structure that allows a receiver to receive and measure the position location signals in a relatively noise free environment. To minimize the noise and interference contributed by surrounding beacons, each beacon can be configured to transmit its corresponding position location signal at a time that no surrounding beacon transmits a position location signal or a data signal.

In an asynchronously scheduled time division multiplex forward link communication system, a time slot can be scheduled as a position location time slot. Each signal source can configure the time slot in the manner specified for a typical data slot. However, the position location time slot can be divided into a plurality of sub-slots that are positioned within what is normally the data field of a data slot. Each signal source can be assigned to a corresponding one of the sub-slots and can transmit its corresponding position location signal during the assigned sub-slot. A packet identifier, such as a MAC address included within the position location time slot, can identify the information contained within the time slot as position location information. The position location time slot can be periodically scheduled or can be scheduled in response to a request for position location information.

Figure 1:
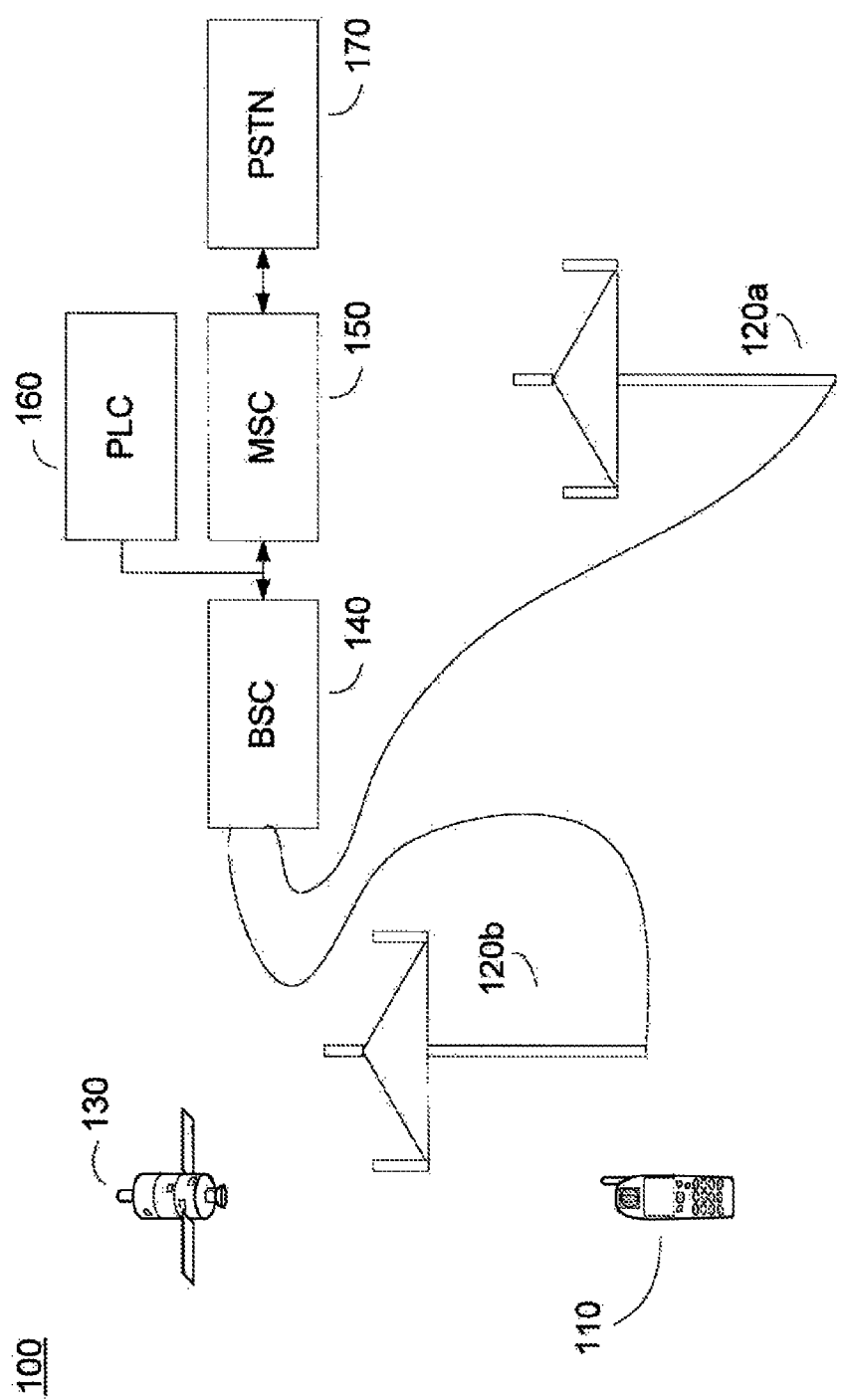
FIG. 1 is a simplified functional block diagram of an embodiment of a position location system.

FIG. 1 is a simplified functional block diagram of an embodiment of a position location system 100 that includes terrestrial beacons. The position location system 100 can include one or more terrestrial elements that can be in communication with a user terminal 110. The user terminal 110 can be, for example, a wireless telephone configured to operate according to one or more communication standards. The one or more communication standards can include, for example, GSM, WCDMA, and CDMA2000 including 1x EV-DO, 1X EV-DV, and CDMA2000 3x. The user terminal 110 can be a portable unit, a mobile unit, a stationary unit. The user terminal 110 may also be referred to as a mobile unit, a mobile terminal, a mobile station, user equipment, a portable, a phone, and the like.

The user terminal 110 typically communicates with one or more base stations 120a or 120b, here: depicted as sectored cellular towers. The user terminal 110 will typically communicate with the base station, for example 120b, that provides the strongest signal strength at a receiver within the user terminal 110. Two base stations 120a and 120b and one user terminal 110 are shown in FIG. 1 for the sake of convenience and clarity. A system typically has numerous base stations and can support more than one user terminal.

The user terminal 110 can determine its position, in part, based on position location signals received from one or more signal sources. The signal sources can include one or more satellites 130, that can be part of a satellite based position location system, such as the Global Positioning System (GPS). The signal sources can also include the one or more base stations 120a or 120b.

Each of the base stations 120a and 120b can be coupled to a Base Station Controller (BSC) 140 that routes the communication signals to and from the appropriate base stations 120a and 120b. The BSC 140 can be coupled to a Mobile Switching Center (MSC) 150 that can be configured to operate as an interface between the user terminal 110 and a Public Switched Telephone Network (PSTN) 170. Therefore, the MSC 150 is also coupled to the PSTN 170. The MSC 150 can also be configured to coordinate inter-system handoffs with other communication systems.

A Position Location Center (PLC) 160 can also be coupled to the BSC 140. The PLC 160 can be configured, for example, to store position location information, such as the location of each of the base stations 120a and 120b in the position location system 100. In one embodiment, the PLC 160 can be configured to provide the information to the user terminal 110 such that the user terminal 110 can determine its location based in part on pseudo ranges to multiple signal sources, where the pseudo ranges can be relative time-of-arrival values. In another embodiment, the PLC 160 can be configured to determine the location of the user terminal 110 based on pseudo range information provided by the user terminal 110. In the latter embodiment, a network server (not shown) in the PLC 160 can perform the position location determination in order to offload processing from the user terminal 110.

The PLC 160 can be configured to command the base stations 120a and 120b, via the BSC 140, to generate the position location signals. In other embodiments, the base stations 120a and 120b can be configured to periodically generate the position location signals.

The base stations 120a and 120b in a time division multiplex forward link system can be configured to generate the position location signals in a manner that allows the user terminal 110 to receive a position location signal with relatively high SNR from a remote base station, for example 120a, even when in the presence of a strong position location signal source, for example 120b.

The base stations 120a and 120b can be configured to be synchronized to a common system time and can be configured to transmit a position location signal within a predetermined time slot. Each base station, for example 120b, can be configured to transmit within the time slot an identifier that can be used to identify the base station from which the signal originated. The identifier can be, for example, a pilot signal burst occurring within a predetermined time during the time slot.

Each time slot can also be configured to include a media access control (MAC) field that includes the MAC address of a destination device. For example, if a base station 120b is transmitting a data packet that is intended for the user terminal 110, the time slot includes a MAC address of the user terminal 110. The user terminal 110 can determine if it is the intended recipient of a received packet by examining the MAC address. The user terminal 110 can ordinarily ignore data packets accompanying time slots that do not have the MAC address corresponding to the MAC address of the user terminal 110.

A position location time slot can include a MAC address that is reserved for position location data. The base stations 120a and 120b use the reserved MAC address when transmitting the position location signals. The user terminal 110 can be configured to examine received packets for the reserved MAC address when attempting position location.

The position location time slot can be further divided into multiple sub-slots, and each base station 120a and 120b can be assigned to at least one of the sub-slots in at least one of the position location time slots. The base stations 120a and 120b within the position location system 100 can be assigned sub-slots in accordance with a reuse scheme that ensures that the same sub-slot is not assigned to base stations having overlapping coverage areas. In one embodiment, each base station 120a and 120b is assigned to a particular sub-slot in the position location time slot. In another embodiment, each sector of a base station 120a and 120b can be assigned to a distinct sub-slot within the position location time slot.

Each base station, for example 120a, can be configured to transmit a corresponding position location signal during its assigned sub-slot. The base stations 120a and 120b do not transmit during the sub-slot for which they are not assigned. The user terminal 110 then effectively receives position location signals from one base station 120a and 120b or base station sector during any sub-slot of the position location time slot. Because only a single base station 120a and 120b or base station sector transmits during any particular sub-slot, the user terminal 110 is able to recover the position location signal in a substantially noise free environment, where noise free refers to the noise and interference generated by surrounding base stations.

Figure 2A:
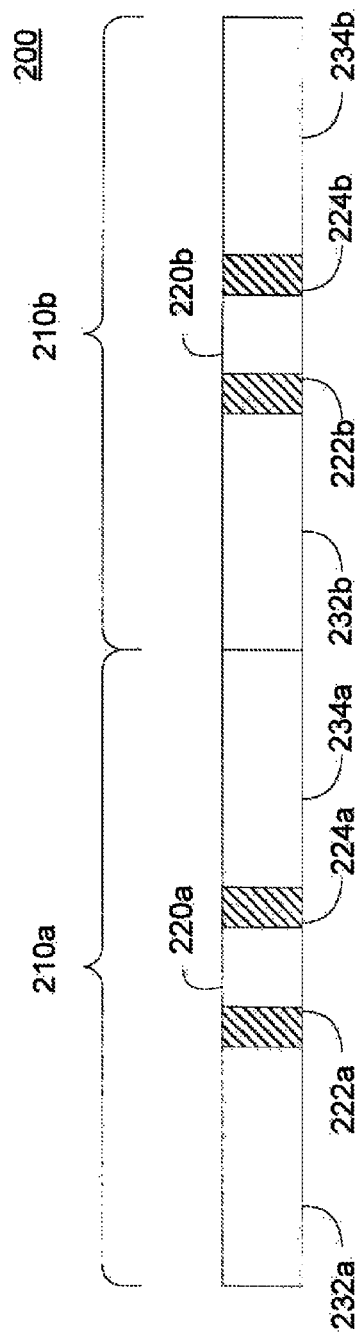
FIGS. 2A-2B are block diagrams of embodiments of slot data structures.

FIG. 2A is a block diagrams of an embodiment of an existing slot data structure 200 in a time division multiplex forward link communication system. The time slot structure 200 can be used, for example, by the communication system shown in FIG. 1. The slot data structure 200 can correspond to a time slot occurring in a CDMA 2000 1xEV-DO communication system. The existing slot data structure 200 is used to illustrate how the position location signaling can be configured to be backward compatible with legacy devices operating in a communication system. The position location methods and apparatus are not limited to implementation in a CDMA2000 1xEV-DO system, but may be implemented in virtually any type of time division multiplex forward link system.

The existing slot data structure 200 includes a time slot that is divided into two half slots 210a and 210b. In one embodiment, each half slot 210a and 210b can be configured independently of the other. In another embodiment, the half slots 210a and 210b can contain the same information.

Each half slot, for example 210a, includes a pilot burst field 220a that is used by the transmitting base station to transmit the pilot channel corresponding to the base station. A user terminal can use the pilot bursts, for example, to initially synchronize with the base station and to determine the identity of the base station.

Each half slot, for example 210a, includes MAC fields occurring before 222a and after 224a the pilot burst field 220a. The MAC fields 222a and 224a can be used to identify the recipient of the data in the half slot 220a. In one embodiment, the first MAC field 222a and second MAC field 224a contain the same MAC address. In another embodiment, the first and second MAC fields 222a and 224a can contain different addresses. In another embodiment, the MAC address can be contained in a combination of the first MAC field 222a and second MAC field 224a.

Within each half slot, for example 210a, there exists data portions 232a and 234a. The data portions 232a and 234a can be used to communicate data to a destination device identified by the corresponding MAC address, such as a user terminal.

Figure 2B:
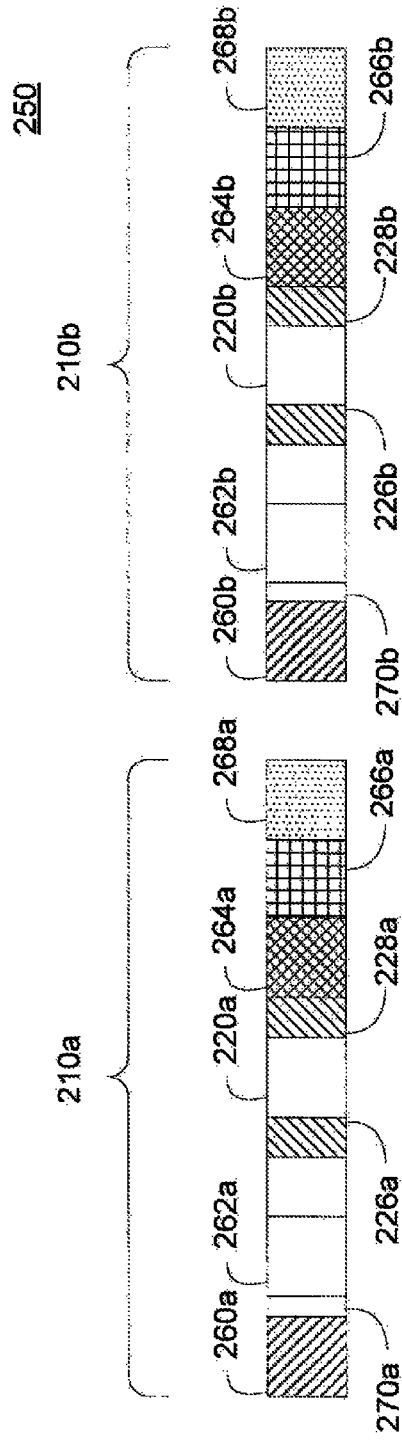

FIG. 2B is a block diagrams of an embodiment of a position location slot data structure 250 in a time division multiples communication system configured for position location information. The position location slot data structure 250 is illustrated from the perspective of the receiver, such as, the user terminal. The differences between the receiver and transmitter perspective will be discussed below.

The position location slot data structure 250 includes two half slots 210a and 210b. In the block diagram of FIG. 2B, the two half slots 210a and 210b are shown separately for the purposes of clarity. The discussion will focus on the first half slot 210. However, the structure of the second half slot 210b can be similar to that of the first half slot 210a.

The first half slot 210a includes a pilot burst field 220a and first and second MAC fields 226a and 228a. The timing of the pilot burst field 220a and first and second MAC fields 226a and 228a can be the same as was used in the existing slot data structure 200 discussed above in relation to FIG. 2A.

In a position location half slot 210a, the MAC address does not correspond to the MAC address of the recipient user terminal. Instead, each position location signal source, such as a base station, inserts a reserved MAC address into the first and second MAC fields 226a and 228a. The reserved MAC address corresponds to a MAC address that does not correspond to any particular receiver in the coverage area supported by the base stations, and may not correspond to any MAC address that can be assigned to any user terminal in the entire system.

In one embodiment, the reserved MAC address is a static MAC address that is configured for the entire system. Each user terminal, or receiver in general, that is configured to process the position location signals can be configured to monitor for the reserved MAC address. In another embodiment, the MAC address can be dynamic, and can be assigned in response to a request for position location signals. The base stations in a location servicing the requesting user terminal can be assigned a MAC address that does not correspond to the MAC address of any user terminal within its coverage areas. The reserved MAC address can be communicated to the user terminal, for example, using an overhead channel, and the user terminal can monitor for the assigned MAC address.

The data portions of half slots 210a and 210b of a position location slot can be further divided into sub-slots. Each of the sub-slots can be assigned to a base station, and the base station can transmit its position location signal in the assigned sub-slot.

The user terminal monitors the slot for the reserved MAC address and processes the entire received slot based on the MAC address. However, the slot includes multiple sub-slot information transmitted by multiple base stations. Each base station only transmits its position location signal in its assigned sub-slot, and the receiver in the user terminal receives the aggregate signal, which can include multiple sub-slot transmissions corresponding to multiple base stations. The position location slot data structure 250 of FIG. 2B shows five separate sub-slots within each half slot 210*a* and 210*b*. However, the position location slot data structure 250 is not limited to having five sub-slots, but may implement any number of sub-slots based on the duration of the slot and the duration of the sub-slots and guard periods.

The sub-slots can be configured to be immediately adjacent to one another or an be configured to have some time between adjacent sub-slots. For example, a first sub-slot 260*a* can be configured to occur at the leading edge of the first half slot 210*a*. A second sub-slot 262*a* can be configured to occur after the first sub-slot 260*a*. There can be a guard period 270*a* between the first sub-slot 260*a* and the second sub slot 262*a*.

The guard period 270*a* can be used to minimize the possibility that a first position location signal transmitted by a first base station assigned to the first sub-slot 260*a* will overlap a second position location signal transmitted by a second base station assigned to the second sub-slot 262*a*.

A timing overlap of adjacent position location signals can occur due to differences in propagation delays that are typically attributable to the distance of the receiver to the signal source. Therefore, if the user terminal is physically close to the second base station and relatively distant from the first base station, the position location signal from the first base station assigned, for example, to the first sub-slot 260*a* will be delayed relative to the position location signal transmitted by the second base station in the second sub-slot 262*a*. If there is no guard period 270*a*, the user terminal may experience some overlap of the two position location signals.

The duration of the guard period 270*a* can be predetermined and can be based on the farthest distance between the two base stations for which a single user terminal may expect to receive position location signals. Alternatively, the duration of the guard period 270*a* can be determined based on a nominal base station distance and an acceptable overlap duration.

In other embodiments, the guard period 270*a* can be eliminated and the sub-slots can be positioned immediately adjacent one another. The embodiment where no guard period exists between adjacent sub-slots is shown in the sub-slots occurring after the pilot burst 220*a* and MAC fields 226*a* and 228*a* of the first half slot 210*a*.

A third sub-slot 264*a* occurs immediately following the second MAC field 228*a*. A fourth sub-slot 266*a* immediately follows the third sub-slot 264*a*. Similarly, a fifth sub-slot 268*a* immediately follows the fourth sub-slot 266*a*.

The guard period 270*a* can be eliminated, for example, where the overlap of adjacent sub-slot information is envisioned to be insufficient to cause degradation of the position location signals. The degradation can be insufficient to cause degradation because of the duration of the overlap is minimal, because the position location signaling is insensitive to timing overlap, or because of a combination of factors.

The position location signals transmitted by each base station can be any one of various position location signals. As described earlier, the position location signals can be PN codes or other codes with preferable correlation properties, and each base station can be assigned one of a plurality of PN codes or PN code offsets.

In one embodiment, the position location signals transmitted by each base station corresponds to the pilot burst for that base station. In other embodiments, the position location signals can be chosen from PN codes that have favorable cross correlation properties. That is, a PN code assigned to a first base station will have low cross correlation with a PN code assigned to a second base station. The use of position location signals having low cross correlation can be used to minimize or eliminate the need for guard periods 270*a*.

A base station thus transmits a position location signal in its assigned sub-slot when no other base station in the surrounding area is transmitting. To the user terminal, the composite position location slot appears as multiple position location signals transmitted in a corresponding multiple of sub-slots. The information in each sub-slot can be received in a substantially noise free environment because only one base station is transmitting during each sub-slot.

Figure 3:
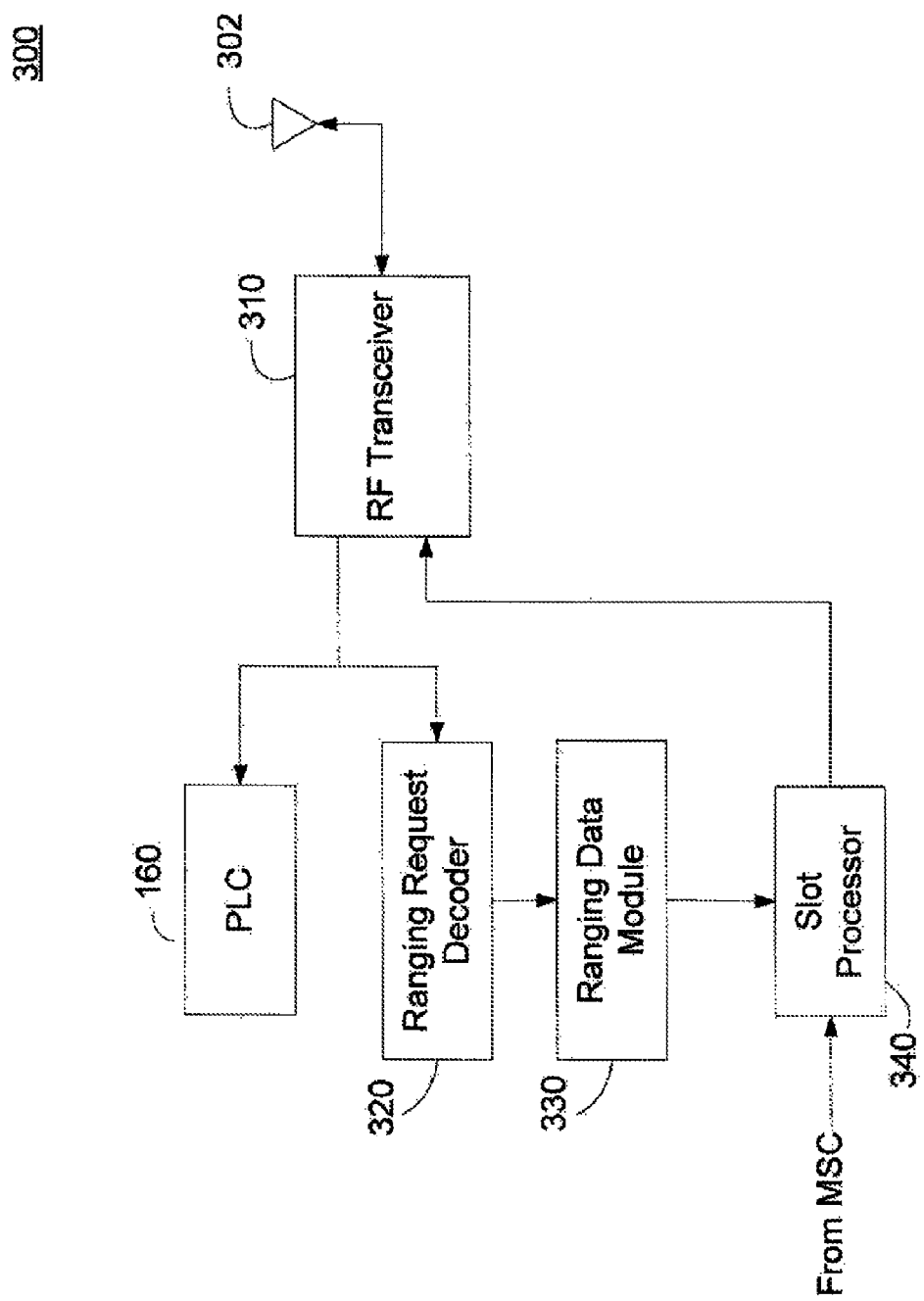
FIG. 3 is a simplified functional block diagram of an embodiment of a position location signal source.

FIG. 3 is a simplified functional block diagram of an embodiment of a position location signal source 300. The position location signal source 300 can include, for example, a base station of the system of FIG. 1, or can be a portion of the base station in combination with some or all of the BSC 140 and PLC 160.

The position location signal source 300 includes a RF transceiver 310 coupled to an antenna 302. The RF transceiver 310 can be configured to receive ranging signals from the user terminals (not shown) and couple them to a PLC 160 for position determination. In one embodiment, the RF transceiver 310 can also receive a request for transmission of a position location time slot. In such an embodiment, the position location signal source 300 can be configured to transmit position location time slots in response to requests from one or more user terminals. In another embodiment, the position location signal source 300 can be configured to periodically transmit position location time slots.

The RF transceiver 310 can couple received ranging requests to a ranging request decoder 320. Alternatively, the PLC 160 or some other module (not shown) can generate a signal to the ranging request module 320 to schedule transmission of a position location signal.

The ranging request module 320 can configure or otherwise command a ranging data module 330 to generate a ranging data, which can be the position location signal that the RF transceiver 310 transmits during the assigned sub-slot. In one embodiment, the position location signal corresponds to the pilot signal for the base station. In other embodiments, the position location signal can be a PN code or some other position location signal. The ranging data module 330 can also be configured to supply the reserved MAC address that is used in the position location timing slots.

The ranging data module 330 can couple the position location signal and reserved MAC address to a slot processor 340 that configures the slots for transmission. The slot processor 340 can be configured to synchronize the timing of the slots with a system time reference.

The slot processor 340 can also be configured to receive the data that is to be transmitted to the various user terminals within the range of the RF transceiver 310. The slot processor 340 schedules the position location slot and configures the position location slot to have the reserved MAC address and pilot burst for the corresponding base station. The slot processor 340 can also be configured to configure the position location signal to the assigned sub-slot. The slot processor 340 couples the configured slots to the RF transceiver 310 to transmit to the user terminals, via the antenna 302.

Figure 4:
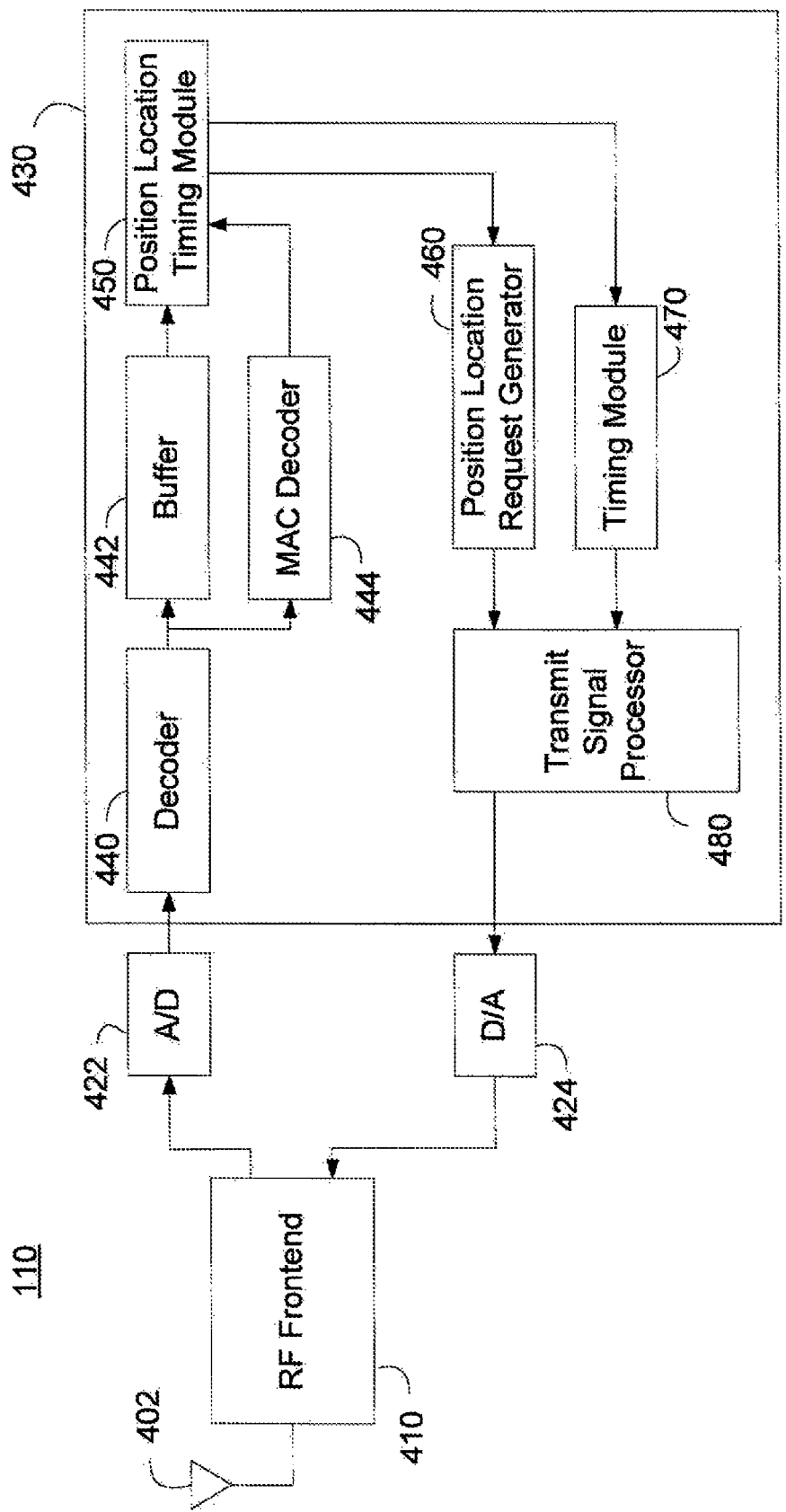
FIG. 4 is a simplified functional block diagram of an embodiment of a user terminal having position location capabilities.

FIG. 4 is a simplified functional block diagram of an embodiment of a user terminal 110 having position location capabilities. The user terminal 110 can be, for example, the user terminal of the system shown in FIG. 1.

The user terminal 110 includes an antenna 402 coupled to an RF frontend 410. The RF frontend 410 can be a transceiver that is configured to downconvert and process received signals as well as upconvert and process baseband signals for transmission. The RF frontend 410 can process all received signals within an operating band. These signals may include data intended for the user terminal, data intended for other user terminals, overhead information, as well as position location information.

An analog to digital converter (A/D) 422 can be coupled to a receive signal output from the RF frontend 410. The A/D 422 can couple the digitized signal to an input of a baseband processor 430.

The output of the A/D 422 can be coupled to a decoder 440 within, the baseband processor 430. The decoder 440 can be configured, for example, to decode encoded symbols that are received and recover the corresponding bits. The decoder 440 may also perform demodulation, dispreading, or some other signal processing of the received signal, depending on the implementation in the system.

The output of the decoder 440 can be coupled to a buffer 442 and a MAC decoder 444. If the slot data structure is similar to that shown in, FIG. 2A-2B, the MAC address occurs in MAC fields that occur after a data field. The user terminal 110 buffers the slot information in the buffer 442 until the MAC decoder 444 is able to decodes the MAC address in the slot.

If the MAC address of the received slot does not correspond to the MAC address of the user terminal 110 or if the received MAC address does not correspond to the reserved MAC for position location slots, the baseband processor 430 can determine that the information in the slot is not intended for the user terminal 110 and can discard or otherwise ignore the information in the buffer 442 and remaining information corresponding to the slot.

If the MAC decoder 444 determines that the MAC address for the received slot corresponds to the MAC address for the user terminal 110, the MAC address can direct the received signals to a signal processor (not shown) that can process the received data. If the MAC decoder 444 determines that the MAC address for the received slot corresponds to the reserved MAC for position location slots, the MAC decoder can enable or otherwise direct the received signals to a position location timing module 450. Therefore, when the MAC address indicates receipt of a position location slot, the received data is coupled from the buffer 442 to the position location timing module 450.

The position location timing module 450 can determine the position of the user terminal 110 based in part on the position location signals received in the position location timing slot if the user terminal 110 is configured for mobile station based position location. In many systems, the user terminal is not configured for mobile station based position location; instead, the user terminal determines one or more pseudo ranges corresponding to the received position location signals and transmits the pseudo ranges to a network or, for example, to a PLC in a position location system, where the location of the user terminal 110 is determined. The latter method can be referred to as mobile station assisted position location.

If the user terminal 110 is configured for mobile station assisted position determination, the position location timing module can determine one or more pseudo ranges corresponding to the signals received in the position location slot and can couple the pseudo range values to a timing module 470 that is configured to configured the one or more pseudo range values for transmission to a network for position determination.

The timing module 470 couples the information to a transmit signal processor 480 that can be configured to encode and modulate the information in a manner specified for the system. The transmit signal processor 480 can couple the processed signal to a digital to analog converter (D/A) 424 where the signal is converted to an analog representation.

The analog representation is coupled from the D/A 424 to the transmit path of the RF frontend 410 where it can be processed into a transmit signal. The RF frontend 410 couples the transmit signal to the antenna 402 where it is transmitted to its destination, which can be, for example, a base station.

As described above, in one embodiment the user terminal 110 can request a position location slot. The position location timing module 450 can be configured to initiate or command a position location request generator 460 when position determination is desired.

The position location request generator 460 can generate a request for a position location slot. The request can be a simple request that identifies the user terminal 110, or can be a more detailed request that includes such information as the identities of the base stations on a candidate list or neighbor list maintained by the user terminal 110. The candidate list or neighbor list can be maintained by the user terminal 110 as part of operating in the communication system. For example, the user terminal 110 can maintain a candidate list and a neighbor list to monitor the signal powers of base stations for potential handoffs.

Figure 5:
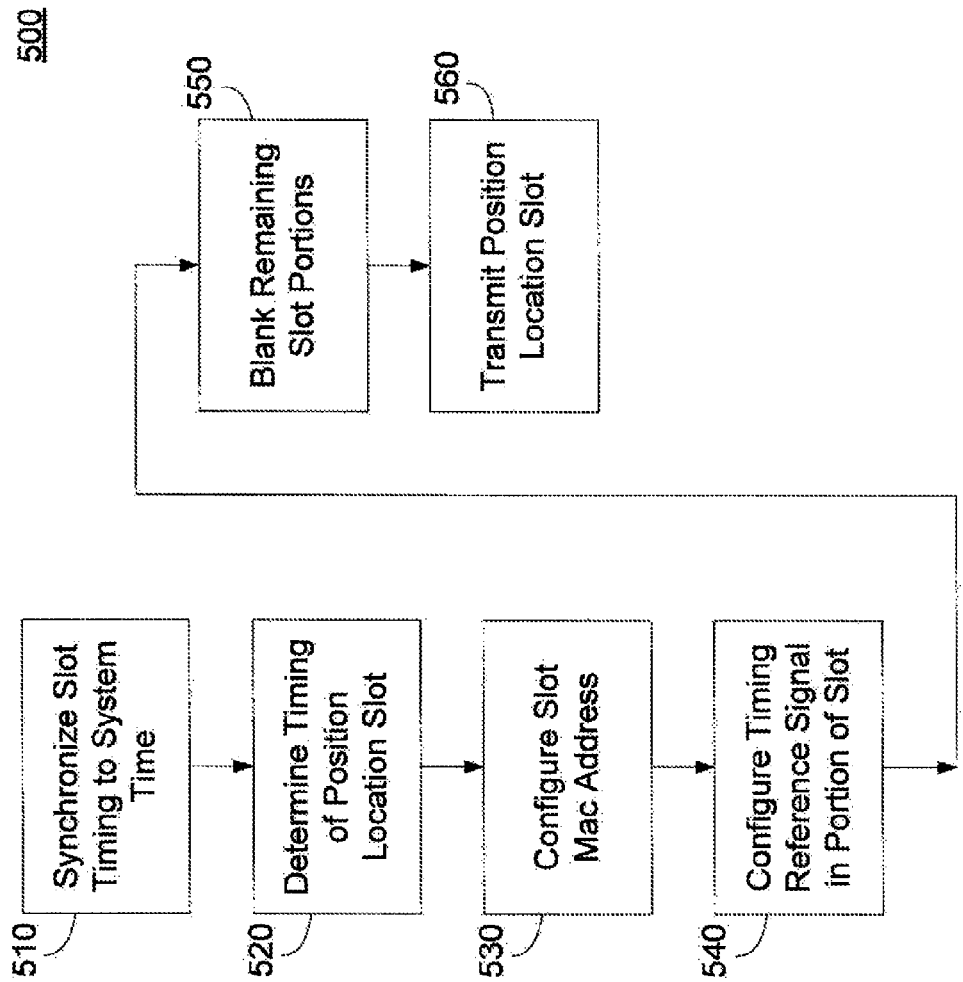
FIG. 5 is a simplified flowchart of an embodiment of a method of generating a position location data slot.

FIG. 5 is a flowchart of an embodiment of a method 500 of generating a position location slot in a time division multiplex forward link system. The method 500 can be performed by the base stations of the system of FIG. 1 or the signal source of FIG. 3.

The base station can initiate the method 500 for each of a periodic position location slot or can initiate the method 500 in response to a request for a position location slot. The method begins at block 520 where the base station synchronizes its slot timing with a system time. In embodiments where the base station is part of a larger time division multiplex forward link communication system, the base station may already be synchronized to a system time regardless of any position location signaling.

After synchronizing the slot timing with a system time, the base station can proceed to block 520 where the base station determines the timing of the position location slot. The scheduling of the position location slot will be coordinated across multiple base stations, such that all of the base stations will transmit the position location signals in a predetermined time within the time slot. The base station may receive the scheduling or timing of the position location slot from, for example, a slot processor that can be implemented in a BSC.

After determining the timing of the position location slot, the base station can proceed to block 530 to configure the MAC address of the position location slot. The base station can configure the MAC address to be a reserved MAC address that is used for position location slots, and is not assigned to any user terminal. Alternatively, a slot processor or ranging data module can be provide a MAC address for the base station to use in the position location slot.

The base station proceeds to block 540 and configures the position location slot by configuring the position location signal in the sub-slot assigned to the base station. The position location signal corresponding to the base station can be, for example, a pilot signal that the base station transmits or can be come other signal such as a PN code, Walsh code, Gold code, or some other sequence.

The base station proceeds to block 550 and blanks the remaining sub-slots of the position location slot. The base station can be configured to actively blank the sub-slots for which it is not assigned. Alternatively, the base station can configure the sub-slots for which it is not assigned to have no data.

After configuring the complete position location slot, the base station proceeds to block 560 and transmits the position location slot at the previously determined time. The base station can repeat the method 500 periodically or can repeat the method 500 based on a position location request.

Figure 6:
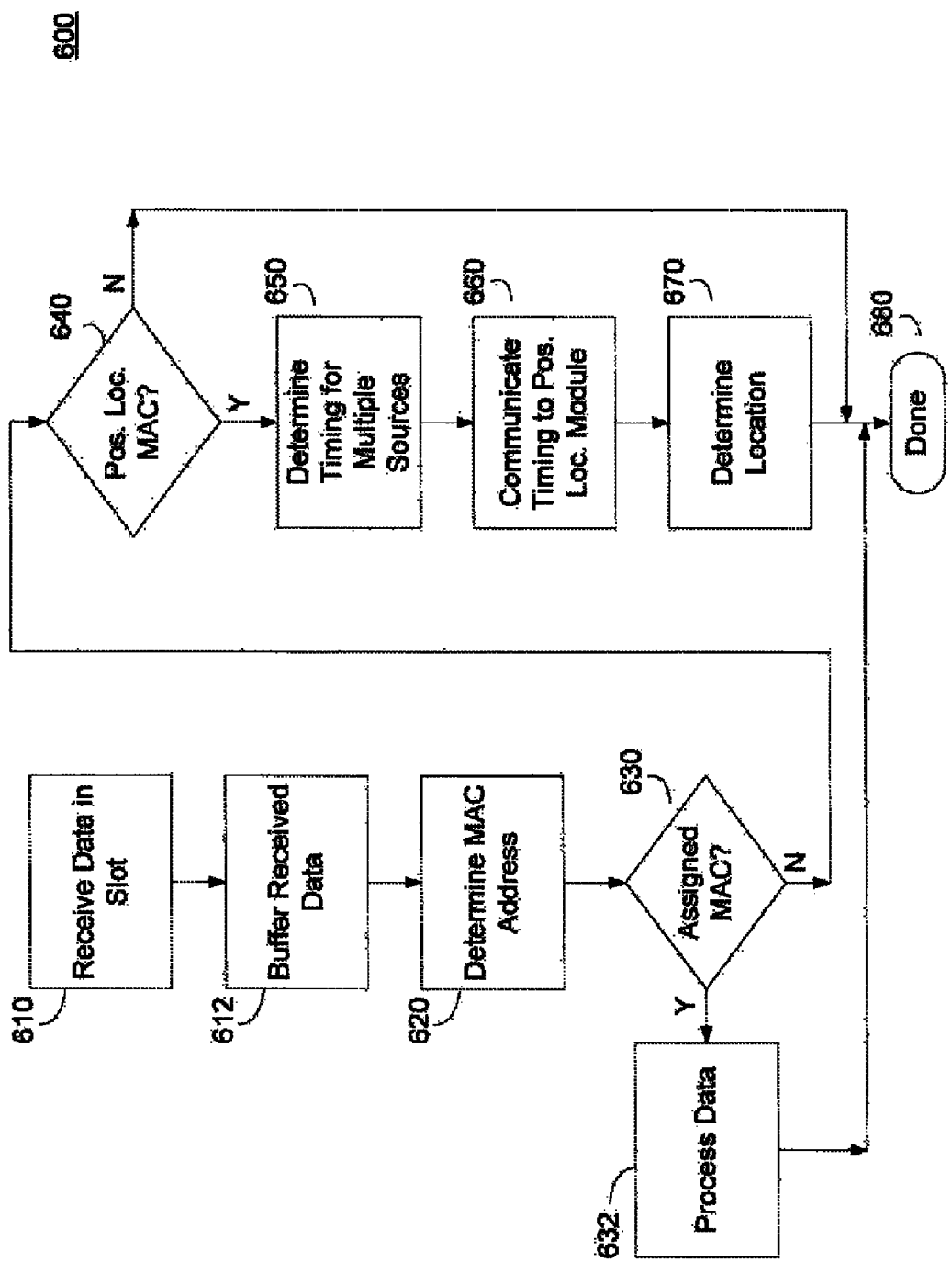
FIG. 6 is a simplified flowchart of an embodiment of a method of using a position location data slot.

FIG. 6 is a simplified flowchart of an embodiment of a method 600 of using a position location data slot. The method 600 can be performed within a user terminal, such as the user terminal of FIGS. 1 and 4.

The method 600 begins at block 610 when the user terminal receives, a data slot. The position location slot can be configured to occur in a time slot that is configured similar to a typical data slot.

The user terminal proceeds to block 612 and buffers the received data. If the data structure of the position location slot is similar to that shown in FIG. 2B, the user terminal cannot determine the MAC address associated with the data slot until after a portion of the data has been received. Thus, the user terminal can buffer the received data at least until the user terminal can determine the slot MAC address.

The user terminal proceeds to block 620 and determines the MAC address associated with the data slot. The user terminal can determine the MAC address in the same manner that is performed for other data slots.

The user terminal proceeds to decision block 630 and determines whether the MAC address determined in the previous block corresponds to the MAC address of the user terminal. If so, the user terminal proceeds to block 632 to process the received data in a conventional manner specified by the user terminal. After processing the data in the conventional manner, the user terminal can proceed to block 680 and the method 600 is done.

Returning to decision block 630, if the user terminal determines that the MAC address of the received slot does not correspond to the MAC address of the user terminal, the user terminal proceeds to decision block 640 to determine whether the received MAC corresponds to the MAC that is reserved for position location slots.

If not, the MAC address probably corresponds to the MAC of some other device and the data in the received slot is not intended for the user terminal. The user terminal proceeds to block 680 and the method 600 is done.

Returning to decision block 640, if the user terminal determines that the MAC from the received slot corresponds to the reserved position location MAC, the contents of the slot correspond to position location signals. The user terminal proceeds to block 650 to process the position location signals.

In block 650, the user terminal determines the timing for each of the position location signals included in the slot. In one embodiment, the user terminal can be synchronized to a system time and can determine a time offset or delay corresponding to the position location signals in each of the sub-slots. Because the signals in each of the sub-slots can correspond to a different signal source, the user terminal can determine a time offset corresponding to each of the signal sources. The user terminal can determine an equivalent pseudo range corresponding to the timing offset, or can determine some other result using the timing offset.

The user terminal proceeds to block 660 and communicates the timing or values determined from the timing to a position location module. The position location module can be within the user terminal for mobile station based position location, or can be in a network for network or mobile station assisted position location. In the latter case, where the position determination is performed in a centralized location, the user terminal can transmit the timing information to a base station to be forwarded to a PLC.

The user terminal proceeds to block 670 and determines its location. If the user terminal is configured for local position determination, the user terminal can determine its location without further assistance. If the user terminal is configured for mobile station assisted position determination, such as where position determination is performed in a common PLC coupled to the base station, the user terminal can determine its position in a message delivered from the PLC to the user terminal. In other embodiments, the user terminal may not determine its location and the block can be omitted. For example, the position determination may only be accessible external to the user terminal, such as when the position determination is used by emergency personnel in response to an emergency call.

Methods and apparatus are disclosed for improving the SNR of a position location signal and for generating position location signals in a manner that is compatible with legacy devices. The SNR of the position location signals can be improved in a time division multiplex forward link system by configuring a data slot to convey position location information. The position location information can be concurrently broadcast by multiple signal sources, each transmitting a portion of an aggregate position location slot received by the user terminal.

The position location time slot can be divided into a plurality of sub-slots. Each base station, or sector of a base station, can be assigned to a particular sub-slot according to a sub-slot reuse algorithm. Each signal source then transmits a position location signal within the assigned sub-slot and does not transmit during those sub-slots for which it is not assigned.

A user terminal can receive an aggregate or composite position location slot that includes the position location signals transmitted by multiple signal sources, each corresponding to a sub-slot within the position location slot. The receiver can receive position location signals with high SNR because each signal source transmits its corresponding position location signal during a sub-slot that is relatively noise free, as no other signal source is intentionally transmitting a signal during a non-assigned sub-slot.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

A software module may reside in RAM memory, flash memory, non-volatile memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage, medium. In the alternative, the storage medium may be integral to the processor.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of determining a position of a mobile device in a time division multiplexed communication system, the method comprising:
   receiving a synchronized position location slot, wherein the synchronized position location slot includes a plurality of sub-slots assigned to a plurality of position location signal sources, and an identifier indicating the synchronized position location slot includes position location information, the synchronized position location slot having a first position location signal corresponding to a first position location signal source in a first sub-slot and a blank sub-slot from a second position location signal source in at least the first sub-slot;
   determining from the first sub-slot in the synchronized position location slot, the first position location signal corresponding to the first position location signal source;
   determining from a second sub-slot in the synchronized position location slot, a second position location signal corresponding to the second position location signal source; and
   determining a timing related to position based on the first and the second position location signals.

2. The method of claim 1, wherein the identifier comprises a MAC address reserved for position location that is distinct from every MAC address corresponding to any receiver in coverage areas supported by the first position location signal source and the second location signal source.

3. The method of claim 1, wherein the first position location signal comprises a pilot burst from the first position location signal source and the second position location signal comprises a pilot burst from the second position location signal source.

4. The method of claim 1, wherein the first position location signal comprises a PN sequence corresponding to the first position location signal source.

5. The method of claim 1, wherein the first sub-slot is separated in time from the second sub-slot by a predetermined guard period.

6. The method of claim 1, wherein the second sub-slot immediately follows the first sub-slot.

7. The method of claim 1, wherein the second position location signal is received during a period of time in which the first position location signal source transmits no symbols.

8. The method of claim 1, further comprising transmitting the timing related to position based on the first and the second position location signals to a position location center.

9. An apparatus for determining a position of a mobile device in a time division multiplexed communication system, comprising:
   means for receiving a synchronized position location slot, wherein the synchronized position location slot includes a plurality of sub-slots assigned to a plurality of position location signal sources, and an identifier indicating the synchronized position location slot includes position location information, the synchronized position location slot having a first position location signal corresponding to a first position location signal source in a first sub-slot and a blank sub-slot from a second position location signal source in at least the first sub-slot;
   means for determining, from the first sub-slot in the synchronized position location slot, the first position location signal corresponding to the first position location signal source;
   means for determining, from a second sub-slot in the synchronized position location slot, a second position location signal corresponding to the second position location signal source; and
   means for determining a timing related to position based on the first and the second position location signals.

10. The apparatus of claim 9, wherein the identifier comprises a MAC address reserved for position location that is distinct from every MAC address corresponding to any receiver in coverage areas supported by the first position location signal source and the second location signal source.

11. The apparatus of claim 9, wherein the first position location signal comprises a pilot burst from the first position location signal source and the second position location signal comprises a pilot burst from the second position location signal source.

12. The apparatus of claim 9, wherein the first position location signal comprises a PN sequence corresponding to the first position location signal source.

13. The apparatus of claim 9, wherein the first sub-slot is separated in time from the second sub-slot by a predetermined guard period.

14. The apparatus of claim 9, wherein the second sub-slot immediately follows the first sub-slot.

15. The apparatus of claim 9, wherein the second position location signal is received during a period of time in which the first position location signal source transmits no symbols.

16. The apparatus of claim 9, further comprising transmitting the timing related to position based on the first and the second position location signals to a position location center.

17. A computer-readable medium including program code, stored thereon, to determine a position of a mobile device in a time division multiplexed communication system, comprising:
   program code to receive a synchronized position location slot, wherein the synchronized position location slot includes a plurality of sub-slots assigned to a plurality of position location signal sources, and an identifier indicating the synchronized position location slot includes position location information, the synchronized position location slot having a first position location signal corresponding to a first position location signal source in a first sub-slot and a blank sub-slot from a second position location signal source in at least the first sub-slot;
   program code to determine from the first sub-slot in the synchronized position location slot, the first position location signal corresponding to the first position location signal source;

program code to determine from a second sub-slot in the synchronized position location slot, a second position location signal corresponding to the second position location signal source; and program code to determine a timing related to position based on the first and the second position location signals.

18. The computer-readable medium of claim 17, wherein the identifier comprises a MAC address reserved for position location that is distinct from every MAC address corresponding to any receiver in coverage areas supported by the first position location signal source and the second location signal source.

19. The computer-readable medium of claim 17, wherein the first position location signal comprises a pilot burst from the first position location signal source and the second position location signal comprises a pilot burst from the second position location signal source.

20. The computer-readable medium of claim 17, wherein the first position location signal comprises a PN sequence corresponding to the first position location signal source.

21. The computer-readable medium of claim 17, wherein the first sub-slot is separated in time from the second sub-slot by a predetermined guard period.

22. The computer-readable medium of claim 17, wherein the second sub-slot immediately follows the first sub-slot.

23. The computer-readable medium of claim 17, wherein the second position location signal is received during a period of time in which the first position location signal source transmits no symbols.

24. The computer-readable medium of claim 17, further comprising program code to transmit the timing related to position based on the first and the second position location signals to a position location center.

25. An apparatus for determining a position of a mobile device in a time division multiplexed communication system, comprising:

An RF frontend for receiving a synchronized position location slot, wherein the synchronized position location slot includes a plurality of sub-slots assigned to a plurality of position location signal sources, and an identifier indicating the synchronized position location slot includes position location information, the synchronized position location slot having a first position location signal corresponding to a first position location signal source in a first sub-slot and a blank sub-slot from a second position location signal source in at least the first sub-slot; and a baseband processor for:
determining from the first sub-slot in the synchronized position location slot, the first position location signal corresponding to the first position location signal source;

determining from a second sub-slot in the synchronized position location slot, a second position location signal corresponding to the second position location signal source; and determining a timing related to position based on the first and the second position location signals.

26. The apparatus of claim 25, wherein the identifier comprises a MAC address reserved for position location that is distinct from every MAC address corresponding to any receiver in coverage areas supported by the first position location signal source and the second location signal source.

27. The apparatus of claim 25, wherein the first position location signal comprises a pilot burst from the first position location signal source and the second position location signal comprises a pilot burst from the second position location signal source.

28. The apparatus of claim 25, wherein the first position location signal comprises a PN sequence corresponding to the first position location signal source.

29. The apparatus of claim 25, wherein the first sub-slot is separated in time from the second sub-slot by a predetermined guard period.

30. The apparatus of claim 25, wherein the second sub-slot immediately follows the first sub-slot.

31. The apparatus of claim 25, wherein the second position location signal is received during a period of time in which the first position location signal source transmits no symbols.

32. The apparatus of claim 25, further comprising the RF frontend for transmitting the timing related to position based on the first and the second position location signals to a position location center.

33. The method of claim 1, wherein the synchronized position location slot has a blank sub-slot from the first position location signal source in at least the second sub-slot.

* * * * *